No. 622,533. Patented Apr. 4, 1899.
C. H. PRESBREY.
AUTOMATIC WATERING TROUGH.
(Application filed Oct. 13, 1898.)
(No Model.)
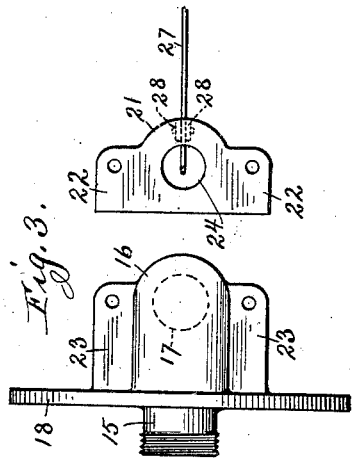
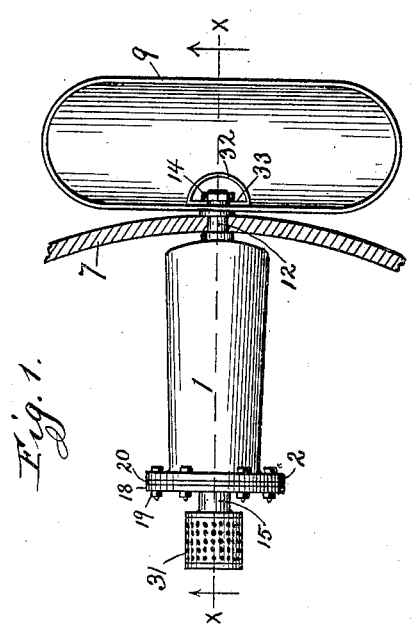
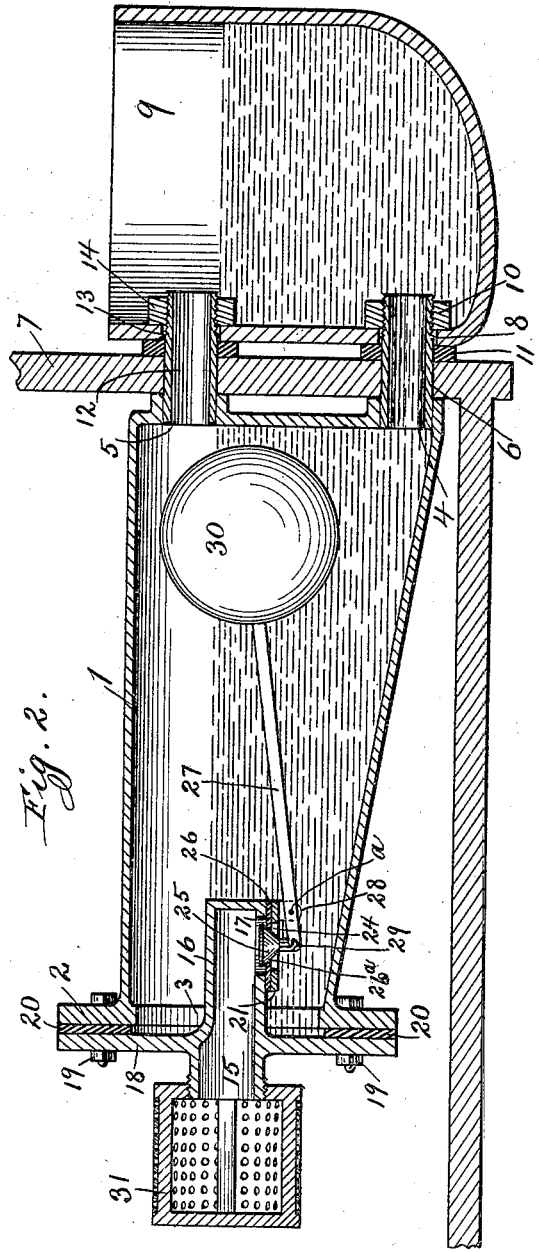
Witnesses:
W. J. Jacker
J. B. Weaver
Inventor:
Charles H. Presbrey.
By Walter N. Haskell,
Atty.
THE NORRIS PETERS CO., PHOTO-LITHO., WASHINGTON, D. C.

UNITED STATES PATENT OFFICE.

CHARLES H. PRESBREY, OF STERLING, ILLINOIS.

AUTOMATIC WATERING-TROUGH.

SPECIFICATION forming part of Letters Patent No. 622,533, dated April 4, 1899.

Application filed October 13, 1898. Serial No. 693,428. (No model.)

*To all whom it may concern:*

Be it known that I, CHARLES H. PRESBREY, a citizen of the United States, residing at Sterling, in the county of Whiteside and State of Illinois, have invented certain new and useful Improvements in Automatic Watering-Troughs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention pertains to automatic watering-troughs, ordinarily known as "hog-waterers," and aims in a novel manner to remedy certain defects in devices of that class and render their operation more certain and efficient. One desirable object in machines of this kind is to have them as small and portable as possible, yet of sufficient capacity to furnish water as fast as the smaller animals or fowls will drink it, and to have the valve controlling the flow of the water work perfectly, so as to prevent leakage, which results in the overflow of the watering-trough and the formation of a mud-hole around the same.

Another feature to be desired is to have the machine so constructed that the valve mechanism will be free from interference through the accumulation of mud in the trough and removed as far as possible from the operation of frost or cold; also to have it protected from injury by animals or meddling persons.

Heretofore the float-chamber has generally been located in the drinking-trough itself, whereas in my construction it is entirely separate and distinct and can be attached to any kind of trough, wooden or metallic, by using suitable connections from the float-chamber to the trough. In my invention the automatic mechanism is completely protected from injury from external causes, and when used in connection with a tank or barrel is situated at or near the bottom thereof, where the water is not so susceptible to the cold as upon the outside, and there is less liability of the valve becoming inoperative through the freezing of the water. In devices of this class the valve regulating the flow of the water into the drinking-trough has been located in the side or end of the valve-chamber, by which construction the seating of the valve upon the valve-seat has not been as perfect as it might be, resulting in leakage.

In my invention by a change in the location of the valve the action thereof is rendered perfect, as will be more fully set forth hereinafter.

In the drawings, Figure 1 is a plan view of my device when in use. Fig. 2 is a vertical cross-section thereof in the line $xx$ of Fig. 1. Fig. 3 is a detailed view of the valve-chamber and mechanism auxiliary thereto.

Similar numbers and letters refer to smiliar parts throughout the drawings.

1 is a metallic float-chamber, cylindrical in form, having the lower wall sloping slightly down toward the watering-trough. The float-chamber 1 is provided at its inner end with the annular head 2, having the circular opening 3 therein. The outer end of the float-chamber 1 is entirely closed, except where provided with circular apertures 4 and 5. A short pipe 6 is rigidly and tightly secured in the aperture 4 and passes through the wall 7 of the tank or barrel and through the opening 8 in the inner wall of the trough 9, which is secured in position by means of a nut 10, adapted to engage a thread on the outer circumference of the pipe 6 at its outer end. A gasket 11, interposed between the main tank and the water-trough 9, prevents leakage from either compartment.

12 is a short pipe or tube rigidly and tightly secured in the aperture 5, passing through the wall 7, through an opening 13 in the inner wall of the trough 9; and provided with a nut 14, adapted to engage a thread on the outer circumference of the pipe 12 at its outer end. This assists in holding the trough 9 in place and adds to its stability.

15 is a short pipe or cylinder projected at its inner end into the valve-chamber 16, having a circular opening 17 in its lower wall. The cylinder 15 is further provided with an annular flange or plate 18, adapted to be secured to the head 2 by means of bolts 19. A gasket 20 is interposed between the head 2 and flange 19 to prevent leakage from the main tank or reservoir into the float-chamber 1.

21 is a metallic plate secured to the lower face of the valve-chamber 16 by means of bolts passing through perforations in the projections 22 and corresponding perforations in the projections 23, extending laterally from the valve-chamber 16.

The plate 21 is provided with a circular opening 24 of about the same diameter as the cone-shaped valve 25.

26 is a gasket, preferably of leather or rubber, held firmly in position between the plate 21 and lower face of the valve-chamber 16 and provided with a circular aperture 26$^a$, of slightly less diameter than the valve 25, and furnishing a valve-seat therefor.

27 is a lever fulcrumed, as at $a$, between two projections 28, depending from the lower face of the plate 21, the lever 27 being loosely attached to the valve 25 by means of the valve-stem 29. To the other or long end of the lever 27 is secured the ordinary hollow spherical float 30. A cylindrical strainer 31 is attached to the outer end of the pipe 15, preventing impurities from entering the valve-chamber and interfering with the working of the valve. To preclude the danger of animals obstructing with their heads or noses the pipes 6 or 12, the outer end thereof may be guarded by a metallic shield 32, of semicylindrical form, furnished with flanges 33, secured between the nuts 10 and 14 and the inner wall of the trough 9.

When my device is first placed in position, the float 30 is at the bottom of the float-chamber 1, but as water is introduced into the main tank or barrel it passes through the pipe 15 and the valve-chamber 16 into the float-chamber and from thence, by means of the pipe 6, into the watering-trough 9. As the water rises in the trough 9 it attains to a corresponding level in the float-chamber 1, carrying with it the float 30, until the valve 25 becomes firmly seated on the valve-seat and the supply of water is cut off. As the water-level is lowered in the watering-trough there is a corresponding fall in the float-chamber, the float 30 descends, and the valve is again opened. By means of the pipe 12 the air in the float-chamber 1 is permitted to escape as the water rises therein or to return as the water-level is lowered. As the water passes through the valve its tendency is downward, and by reason of the sloping bottom wall of the float-chamber the current is always toward and through the pipe 6, precluding the possibility of any sediment working inward through such pipe and tending to remove any impurities that might find their way into the float-chamber.

In mechanism of this class the valve controlling the flow of water into the watering-trough is acted upon by two forces—namely, by the float being elevated in the float-chamber by the rising of the water-level therein and by the direct pressure of the water in the valve-chamber upon the valve. As hereinbefore mentioned, devices of this kind have been constructed with the valve located in the side or end of the valve-chamber, in which case a complete closing of the valve was only assured when the float was at its highest possible elevation. If the force exerted by the float was slightly relieved, the tendency of the valve was to drop downward and away from the valve-seat, so that any force exerted by the water in the valve-chamber upon the valve forced such valve against the lower edge of the valve-seat, but could not place it in proper position thereon. The force thus exerted by the water instead of assisting the operation of the float frequently interfered therewith. In time the valve-seat became worn on the lower edge, losing its circular form, and at no time could the perfect action of the valve be relied upon.

In my device by use of the cone-shaped valve in the lower side of the valve-chamber if there is any tendency of the valve to drop it is in a downward direction upon its seat, its conical shape causing it to drop squarely into the opening in the valve-seat, and as soon as there is the least tendency on the part of the float to close the valve it is ably assisted by the pressure of the water upon the top thereof. In using a horizontal valve-seat less energy on the part of the float is required. Consequently a float of smaller size can be used, which is desirable in my machine.

It is apparent that my device is adapted to be used in connection with any kind of tank, wooden or metallic, or it can be located some distance from the main reservoir and connected therewith by a pipe of suitable dimensions, in which case the strainer 31 would be omitted and the connecting-pipe attached to the pipe 15. When used in this way, the wall 7 of the tank may be supplied, if desired, by a plank of suitable thickness perforated for the passage of the pipes 6 and 12 and driven into or otherwise secured to the ground to hold the trough in place. When used in this way, the metallic cylinder 1 amply protects the mechanism located therein; but when my device is within the tank or barrel there is no possibility of injury thereto.

What I claim as my invention, and desire to secure by Letters Patent of the United States, is—

1. In an automatic watering-trough, the cylindrical metallic chamber 1, located in the main body of water, and having mechanism to control the flow of water therethrough; said chamber being further provided with the vent-pipe 12, the outlet-pipe 6, and having a sloping lower wall to cause a current in the direction of the outlet-pipe 6, and keep said chamber 1 free from impurities, substantially as set forth.

2. In an automatic watering-trough, the combination of the chamber 1, provided with the head 2; the pipe 15, provided with the flange 18; valve-chamber 16; valve 25, and means for automatically operating the same; the pipes 6 and 12, and shield 32, substantially as shown and set forth.

In testimony whereof I affix my signature in presence of two witnesses.

CHARLES H. PRESBREY.

Witnesses:
   IRVING S. WEAVER,
   VAN FLEET BOZÉ.